Dec. 7, 1926.
B. C. VON PLATEN ET AL
1,609,334
REFRIGERATION
Filed August 18, 1926   7 Sheets-Sheet 1
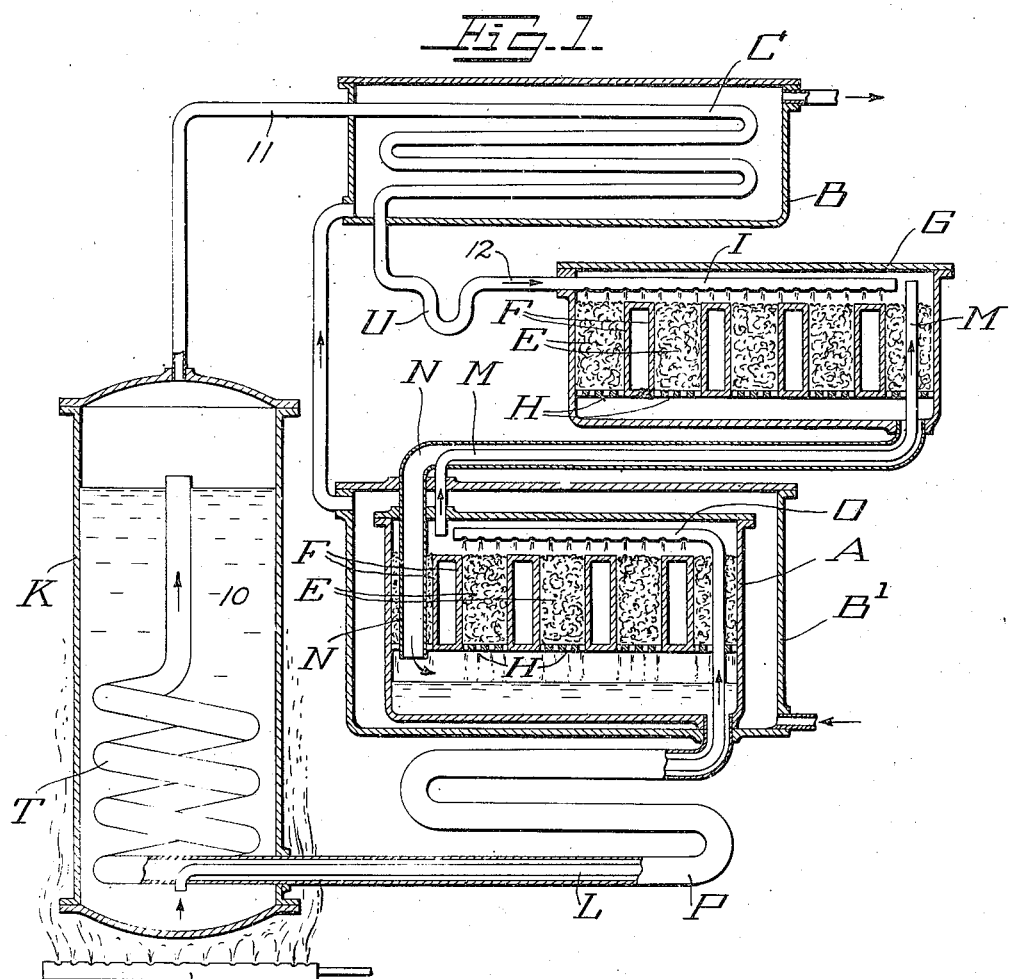
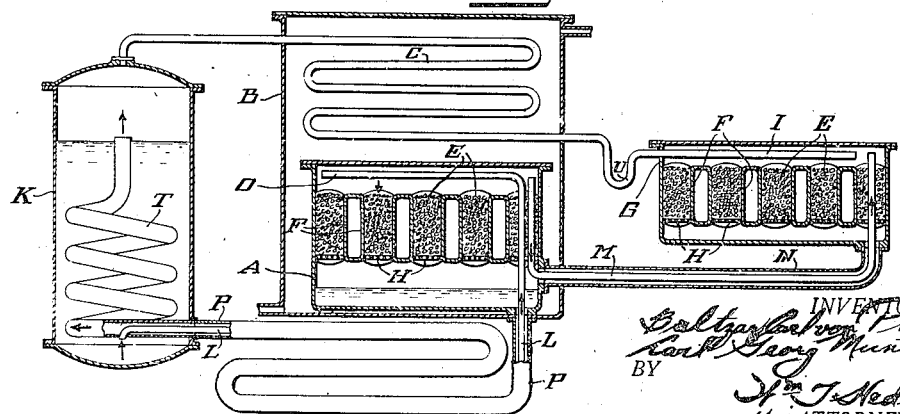
INVENTORS
Baltzar Carl von Platen
Carl Georg Munters
BY
Wm. J. Hedlund
their ATTORNEY

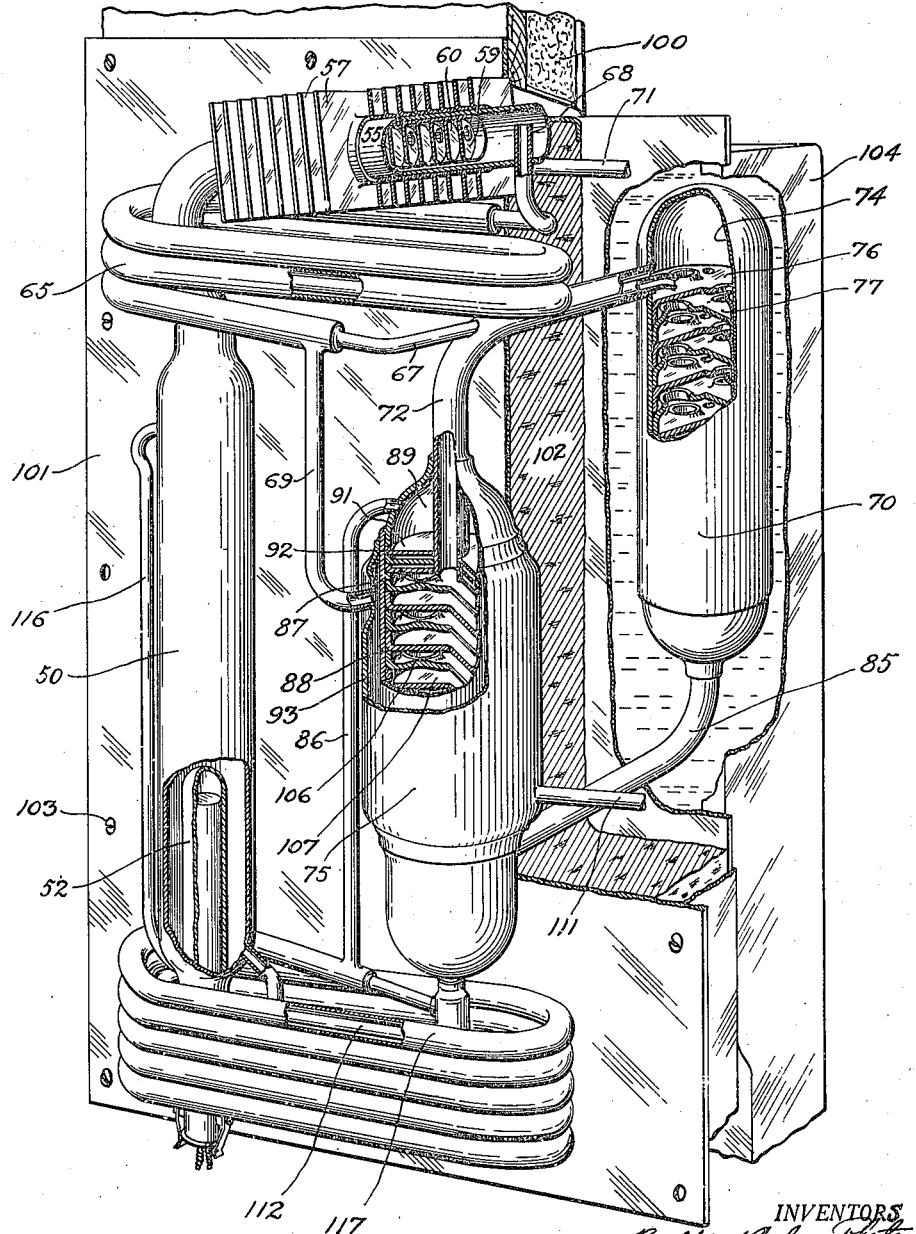

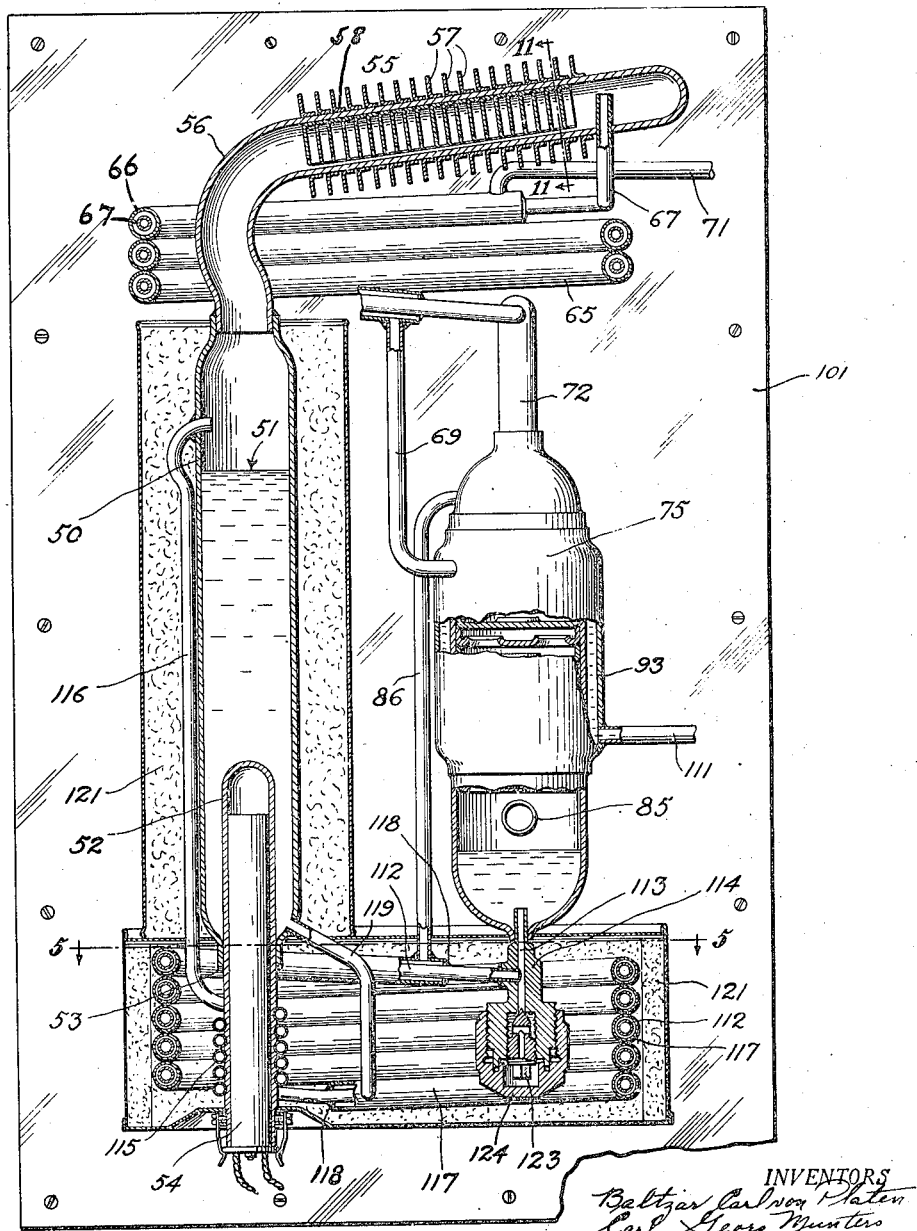

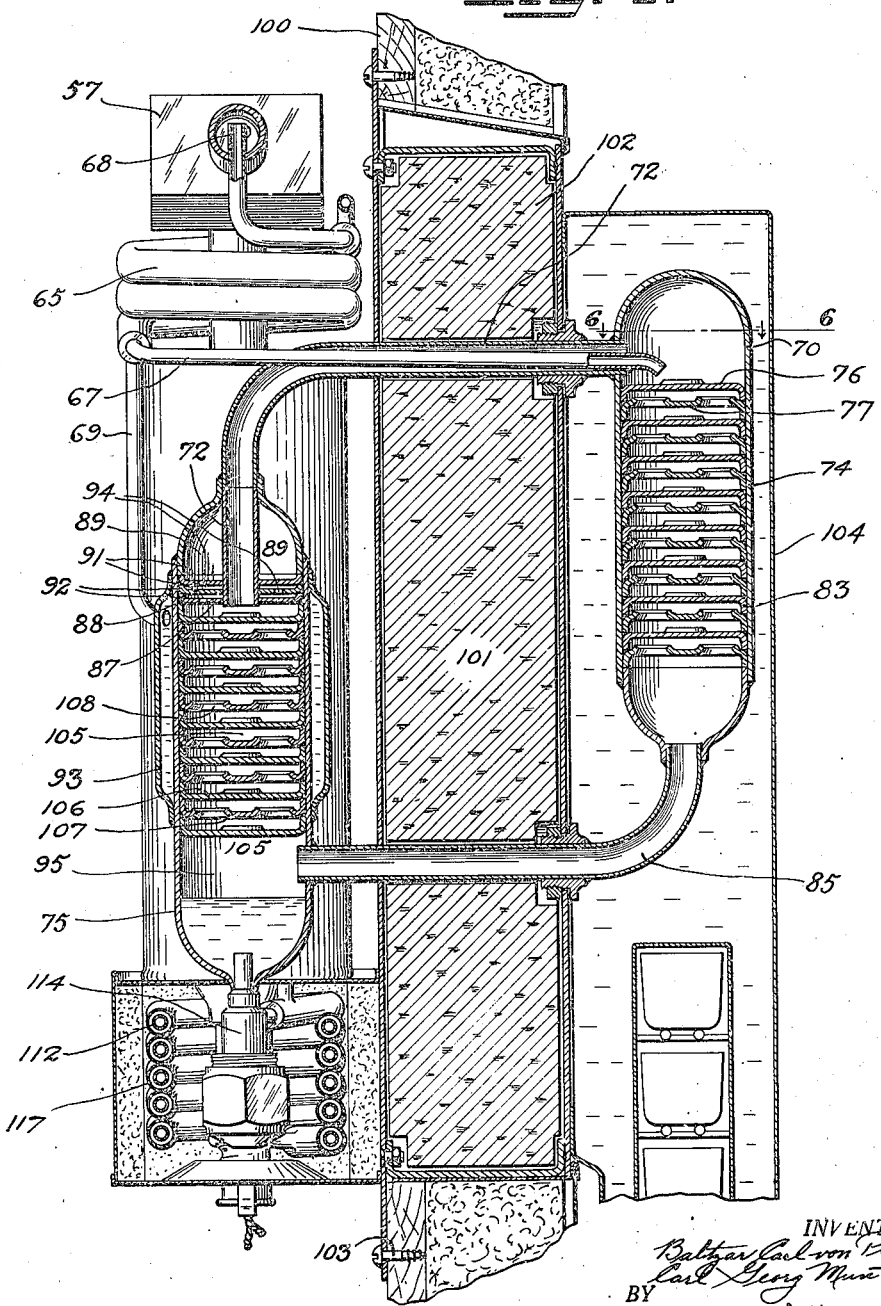

Dec. 7, 1926.
B. C. VON PLATEN ET AL
1,609,334
REFRIGERATION
Filed August 18, 1926    7 Sheets-Sheet 5
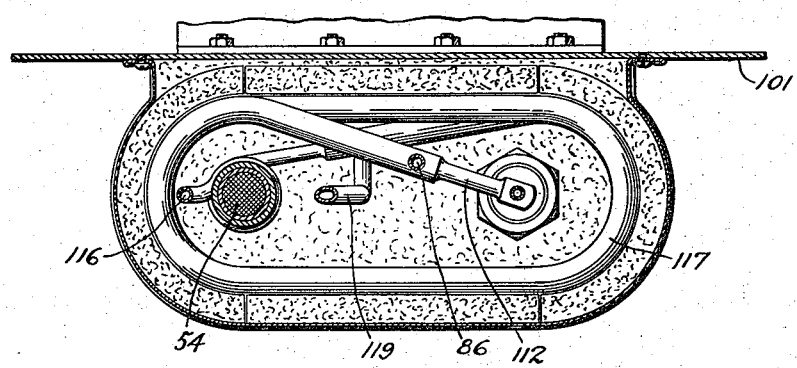
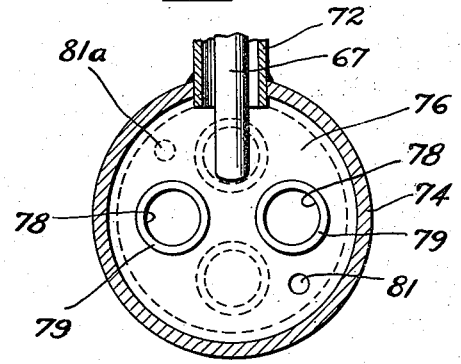
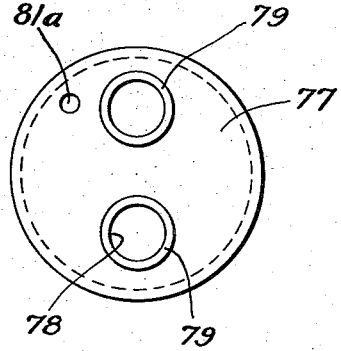
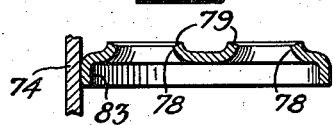
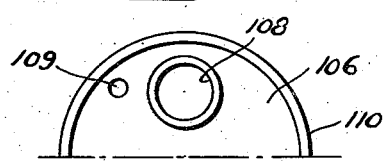
INVENTORS
Baltzar Carl von Platen
Carl Georg Munters
BY
N. T. Hedlund
their ATTORNEY

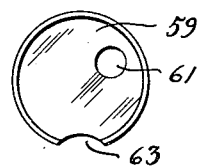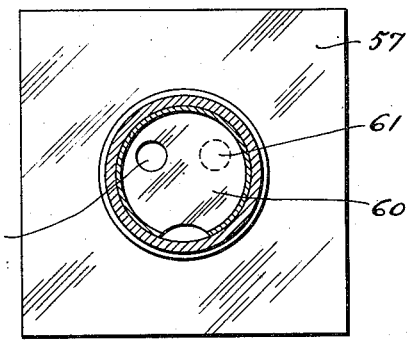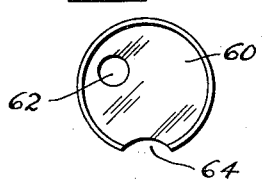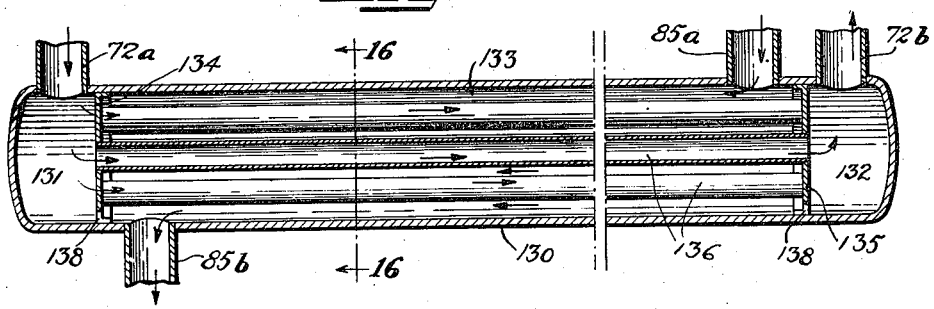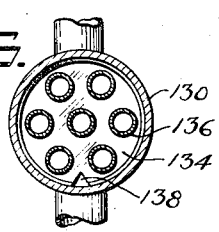

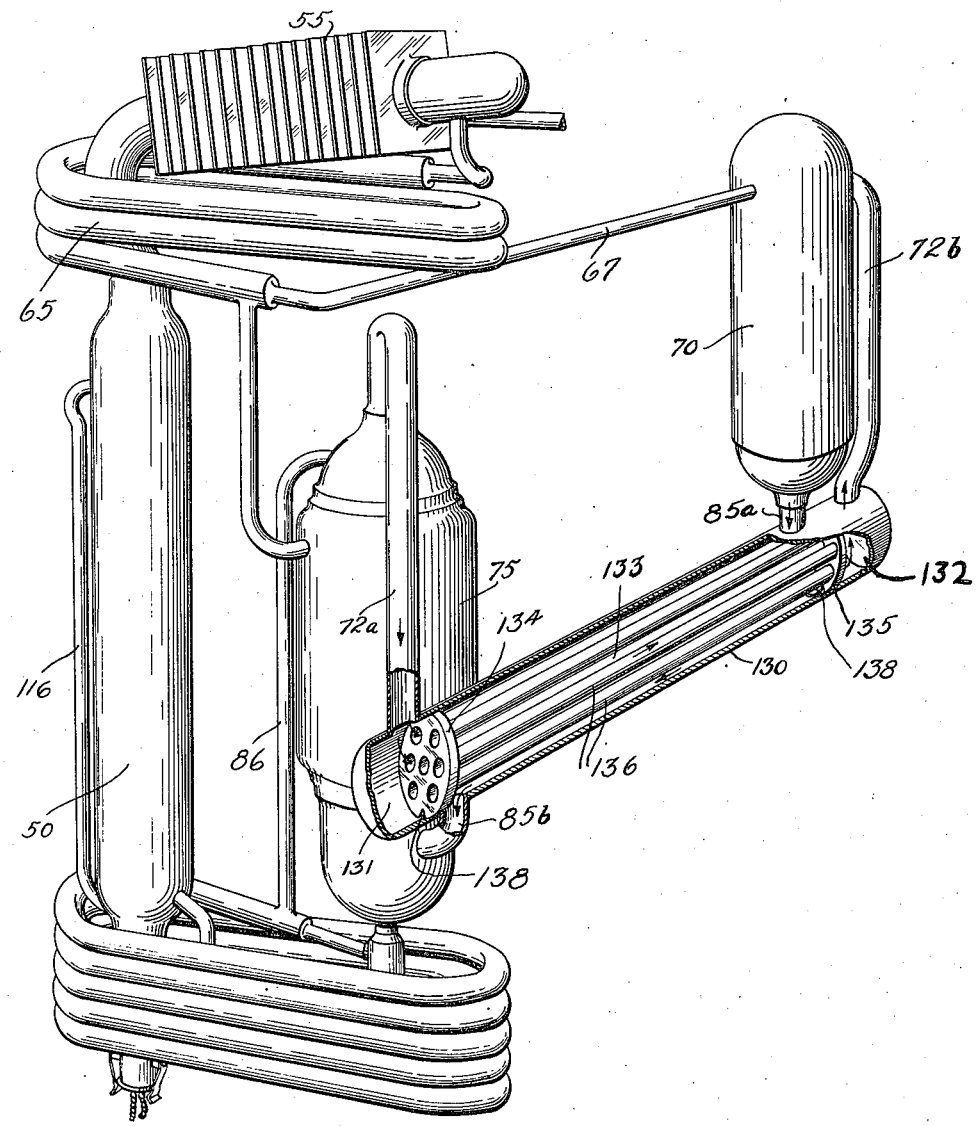

Patented Dec. 7, 1926.

1,609,334

UNITED STATES PATENT OFFICE.

BALTZAR CARL VON PLATEN AND CARL GEORG MÜNTERS, OF STOCKHOLM, SWEDEN, ASSIGNORS TO ELECTROLUX SERVEL CORPORATION, OF NEW YORK, N. Y., A CORPORATION OF DELAWARE.

REFRIGERATION.

Application filed August 18, 1926. Serial No. 130,086.

This application is filed to replace our copending application Serial No. 596,646 filed in the United States on October 24, 1922, and in Sweden on August 18, 1922, and describes and claims subject matter contained in our copending applications Serial No. 655,768, filed August 4, 1923; Serial No. 17,035, filed March 20, 1925; and Serial No. 60,087, filed October 2, 1925. This application is to be considered as relating back for common subject matter to the respective filing dates of the respective above identified applications herein continued in part or whole, and to the rights incident thereto.

Our invention relates to the art of refrigeration, more particularly to refrigerating apparatus of the absorption type and still more particularly to refrigerating apparatus wherein evaporation is effected by diffusion of one substance into another.

Amongst the various objects of our invention are: To provide a practical, operative and highly efficient refrigerating apparatus without moving parts; to provide a self-contained, hermetically closed refrigerating apparatus wherein circulation of fluid is obtained entirely under the influence of factors within the apparatus; to provide an automatic refrigerating apparatus employing an auxiliary pressure equalizing agent wherein circulation of absorption liquid, cooling agent and auxiliary agent is obtained by formation, wholly within the apparatus, of pressure gradients or pressure forces which besides being entirely produced within the apparatus, are entirely dissipated within the apparatus in the production of circulation; to cause automatic and effective circulation of the auxiliary agent between and through the evaporator and absorber by difference in specific weights of a mixture of the cooling agent and the auxiliary agent on the one hand and the auxiliary agent on the other hand; to cause automatic and effective circulation of the auxiliary agent between and through the evaporator and absorber exclusively by difference in specific weights of the cooling agent and the auxiliary agent; to cause automatic and effective circulation of absorption liquid between and through the generator and the absorber exclusively by application of heat; to provide a refrigerating system having a constant pressure throughout the same in which an effective circulation of absorption liquid between and through the generator and the absorber is effected exclusively by application of heat; to cause circulation through a complete refrigerating system solely by differences in specific weight; to provide a constant pressure refrigerating system of the type described wherein an effective circulation of all the media used is maintained solely by application and withdrawal of heat; to cause generation of vapor from rich absorption liquid in two places in the refrigerating system, in one of which places the generation is essentially intended to promote circulation between the absorber and the generator and in the other of which the generation serves to expel the cooling agent from the rich absorption liquid; to provide measures for preventing introduction of vapor of absorption liquid into the evaporator; to provide efficient means for distributing liquid for contact with gas in the evaporator and absorber; to provide an apparatus which is entirely safe in operation and which, although operating under pressure, cannot become injured by excess of pressure; to provide an apparatus having sufficient circulation in major and local cycles of circulation for the desired extent of refrigeration; to provide an apparatus which is readily adaptable to use in domestic refrigerating cabinets; to provide interchange of heat in various parts of the absorption refrigerating apparatus to obtain high efficiency; and to provide a hermetically closed refrigerating unit, the different parts of which are arranged in open and unobstructed communication with each other, that is, without interposed shut-off devices, and in which circulation of the cooling agent, the auxiliary agent and the absorption liquid is effected simply by heating the unit in a suitable way.

The present invention consists in method and apparatus for carrying the above outlined objects into effect. It involves various novel features including the maintenance of circulation between and through the absorber and evaporator in a system wherein there is complementary diffusion of fluids for the purpose of evaporation, the circulation being maintained under the influence of internal workings and characteristics, in the preferred form, by a grouping and segregation of substances of different characteristics effecting production of a head due to difference in weights of vertically arranged bodies of the same, this head being the motivating agency for circulation.

In another phase the invention includes method and apparatus for producing a circulation between the absorber and generator which is preferably dependent solely upon application of heat or other means for changing specific weights of a stream of liquid passing in a local cycle of circulation between the absorber and the generator.

In a further phase of the invention it includes the circulations described in the two paragraphs immediately preceding as local circulations together with a major circulation of a principal fluid of refrigeration.

The invention also includes a novel element which we have termed a radiator, the object of function of which will be discerned from the following description.

Further objects, novel features and advantages of the invention will be apparent as the description proceeds which is presented with reference to the accompanying drawings of which:

Fig. 1 illustrates the basic principles of operation of our invention;

Fig. 1a is a modification of the illustration of Fig. 1;

Fig. 2 is a perspective view of a complete, practical, working, refrigerating apparatus according to our invention;

Fig. 3 is what may be termed a front view of the refrigerating apparatus, partly in section, showing those parts termed generator, radiator, condenser and absorber;

Fig. 4 is a sectional view through the absorber and evaporator;

Fig. 5 is a section taken on line 5—5 of Fig. 3;

Fig. 6 is a section taken on line 6—6 of Fig. 4;

Fig. 7 is a plan view of one form of distributing disk used in the evaporator;

Fig. 8 is a sectional view of one form of disk used in the evaporator;

Fig. 9 shows one form of baffling member used in the radiator;

Fig. 10 shows a different form of baffling member also used in the radiator;

Fig. 11 is a section taken on line 11—11 of Fig. 3;

Fig. 12 is a half-plan view of a disk used in the absorber;

Fig. 13 shows a modified form of distributing disk;

Fig. 14 is a perspective view of a modified refrigerating apparatus;

Fig. 15 is an elevation of a portion of the apparatus shown in Fig. 14; and

Fig. 16 is a cross-section taken on line 16—16 of Fig. 15.

The principles of operation of our invention can probably be most readily determined upon consideration of Fig. 1 which is more or less diagrammatic but which shows clearly the principal parts of a form of refrigerating system embodying our invention and the various cycles of circulation of fluids which serve to bring about the desired results.

In Fig. 1, K designates a generator which contains the cooling agent, for instance, ammonia, dissolved in a suitable absorption liquid such as water. The generator may be heated by any of various known means as, for example, by gas burner 14. Although it will be obvious that various substances may be used as cooling agent, we prefer ammonia, but, in describing the apparatus as using ammonia, it is to be understood that this is by way of example only. Ammonia vapor is expelled from the solution 10 in the generator and passes through conduit 11 into the condenser C in which the vapor is condensed due to the cooling effect of a cooling fluid such as water, which is caused to circulate through the tank B in which condenser C is placed. The condenser is connected, by means of a conduit 12, with an evaporator G, otherwise known as "cooler" and which constitutes the refrigerating member. In conduit 12 there is a liquid seal U which is intended to prevent passage of gas therethrough. Within the evaporator is a perforated distributor I which is connected with conduit 12 and through the perforations of which liquid ammonia is introduced into the evaporator. Within the evaporator there is preferably placed means for distributing and dividing the liquid cooling agent over a large surface. For this purpose there is shown a series of tubular cells F which communicate with each other at the top and at the bottom and which are provided with perforated bottoms H. These cells contain a distributing material E which may consist of metal wool or cuttings.

The evaporator G is connected to the absorber A by means of conduits M and N which are preferably arranged to form a heat exchanger. This is done in the example shown by having pipe M pass within pipe N. Pipe M connects the top of the absorber with the top of the evaporator and pipe N connects the bottom of the evaporator with the lower part of the absorber. The evaporator is placed at a higher level than the absorber in order to prevent the evaporator-absorber connection being closed up by liquid. The absorber is enclosed in a tank B¹ and is also cooled by cooling fluid flowing through the same.

The generator K and absorber A are interconnected by means of pipes L and P which preferably are arranged to form a heat exchanger. Pipe L lies within pipe P and extends from the lower part of the generator to the upper part of the absorber where it terminates in a perforated distributor O. Like the evaporator, the absorber preferably contains distributing means such as the tubular cells F with perforated bottoms H containing distributing material E. Pipe P connects the lower part of the absorber with the upper part of the generator and, in the example shown, extends into the generator and passes upwardly through the solution 10 therein in the form of a coil T.

The mode of operation is as follows:

Heat is applied to generator K whereupon ammonia is expelled from the solution 10 and passes in the form of vapor through conduit 11 into the condenser C. In condenser C the vapor is condensed (that is, liquefied) and passes on through conduit 12 to the evaporator. The liquid ammonia entering the evaporator is spread over the distributing material E by help of the perforated distributor I. The evaporator is supplied with the auxiliary agent (preferably a gas which is non-condensable at the temperature at which it operates and inert with respect to other chemical substances within the apparatus) such as hydrogen (as will be presently explained) into which and in the presence of which the ammonia diffuses and evaporates.

This process of diffusion of the cooling agent into the auxiliary agent (which obviously entails diffusion of the auxiliary agent into the cooling agent) results in evaporation of the cooling agent whereby heat is abstracted from the surroundings of the evaporator (or, in other words, refrigeration is produced) without however necessitating change in actual or total pressure (that is, the value of pressure registered on the ordinary well-known direct-connected pressure gage) between the condenser and the evaporator.

The reason that hydrogen is chosen as an auxiliary agent to work with ammonia as a cooling agent is in part that these two substances have very greatly different specific weights and greatly different molecular weights, as a result of which it is possible to obtain an efficient circulation and an efficient diffusion. The circulation is brought about with other cooperating factors hereinafter more fully dealt with.

For reasons presently to be explained, the ammonia gas and hydrogen mixed in the evaporator flow downwardly therein and through pipe N into the lower part of absorber A.

In the absorber the gas mixture comes into contact with weak absorption liquid supplied thereto from the generator K through pipe L and distributor O, that is, with liquid in which there is relatively less cooling agent dissolved. By this grouping of the gaseous mixture and the absorption liquid, which, in the illustration given, is water, the result is an absorption or dissolving of ammonia by water and a liberation of hydrogen. Now since, as above stated, hydrogen is of markedly different specific weight than ammonia, and since hydrogen is very much lighter than ammonia, it will be seen that the weight per unit volume of gas after being freed from ammonia in the absorber is less than the weight of gaseous mixture per unit volume formed in the evaporator. Therefore, with a suitable interconnection of the evaporator and absorber, one example of which is shown in Fig. 1 and above described, there will be a preponderance of downwardly directed gravitational force produced in the evaporator for causing automatic circulation of gas between and through the evaporator and absorber. This may be expressed by saying that a head is produced due to the difference in specific weights of the mixture of vapor of the cooling agent and the gaseous auxiliary agent on the one hand and the auxiliary agent itself on the other hand, since head is a measure of preponderating force of vertically extending bodies of different specific weights. In the arrangement illustrated in Fig. 1, the vertically extending bodies, when the apparatus is in operation, are the contents of the evaporator and pipe N on the one hand and the contents of the absorber and pipe M on the other hand. The hydrogen passes upwardly in the absorber and through pipe M into the upper part of the evaporator where it is again mixed with the heavier ammonia vapor and is carried downwardly as part of the mixture through pipe N to the lower part of the absorber in which ammonia is forced into the solution and the lighter hydrogen is freed, and again passes upwardly within the absorber. There is thus established an automatic circulation of gas between and through the evaporator and absorber, which makes it possible to obtain a refrigerator of this kind without moving parts.

In the process as thus outlined the head is produced rather by difference in degrees of mixture than by absolute separation and mixture. Some ammonia passes through pipe M from the absorber to the evaporator along with the hydrogen. But the amount of ammonia thus entrained is small relative to the proportion of ammonia in the mixture within the evaporator. The liberation of hydrogen is thus a relative liberation but sufficient to give the necessary circulation.

It is also necessary to obtain a circulation of the absorption liquid. This is effected in the following manner:

The strong absorption liquid saturated with ammonia is carried from the absorber through pipe P and coil T due to the influence of heat applied to coil T which, in the case illustrated, receives its heat from the same source as the generator K, and in this stage of the cycle process there occurs also a change in specific weight which effects circulation. The liquid in the absorber is thus raised to the higher level of liquid in the generator by application of heat to a stream of liquid flowing from the absorber into the generator. The coil T is in effect a thermosiphon through which liquid is raised by vapor developed therein to a level high enough to allow the liquid to flow by gravity from the generator into the absorber.

The whole of the above outlined process takes place at uniform actual or total pressure (that is, under uniform pressure under the ordinary meaning of "pressure" as that word is used alone) except as that pressure is modified by very slight variations due to static heights of liquid or gas and except as affected by flow in the various conduits.

While the actual or total pressure is constant, there is a variation of so-called partial pressure in the evaporator. The sum of the partial pressures of the ammonia and hydrogen in the evaporator is equal to the actual or total pressure. In the illustration given, the apparatus may be at a total absolute pressure of 16 atmospheres while the partial pressure of the ammonia in one portion of the evaporator is 3.5 atmospheres and the partial pressure of the hydrogen at the same place is 12.5 atmospheres. Evaporation takes place due to the fact that the partial pressure of the ammonia vapor in the mixture is lower than the pressure of saturated ammonia vapor at the temperature existing within the evaporator. This state of affairs is maintained by the circulation of hydrogen and the removal of ammonia vapor along with the hydrogen into the absorber when the hydrogen gas has become substantially saturated with ammonia vapor.

As above pointed out, the maintenance of constant pressure is obtained primarily on account of using an auxiliary agent, into which the cooling agent diffuses. Effective and continuous refrigeration is obtained by the continuous and automatic circulation of the auxiliary agent into and out of the presence of the cooling agent under the influence of factors built up within the system.

In the illustration given which includes ammonia as the cooling agent and hydrogen as the auxiliary agent, the circulation which is effected by changes of specific weight is obtained not alone on account of the original choice of materials of greatly different specific weight, but also by changes in specific weight due to different relative temperatures existing in the evaporator and absorber. The temperature in the evaporator is considerably lower than in the absorber and this causes an increase in specific weight of the gaseous mixture within the evaporator which would not be obtained if the evaporator and absorber were at the same temperature. The result of this influence is a greater downwardly directed force in the evaporator than is given in consequence of the original selection of materials, which, gaged by uniform conditions, have different specific weights. In this instance the two effects of combining and segregating on the one hand and of different relative temperatures between the evaporator and absorber on the other hand, act, so to speak, in parallel to give added force in causing circulation.

From the above description it will appear that the method or system of refrigeration involved embodies three cycles of fluid circulation of which one may be considered a major cycle of circulation and the other two local cycles. The major cycle of circulation is that of the cooling agent, ammonia, from the generator, through the condenser, through the evaporator, through the absorber and back to the generator. One of the local cycles of circulation is that of the auxiliary agent, hydrogen, confined to the evaporator and the absorber. The other local cycle of circulation is that of the absorption liquid, confined to the generator and absorber.

Figs. 2, 3, 4, 5, 6, 7, 8, 9, 10, 11 and 12 are reproduced from a practical working apparatus embodying the features illustrated by and described in connection with Fig. 1 and embodying additional features giving a high efficiency in actual operation. In the apparatus shown in Fig. 2, reference character 50 designates the generator which corresponds to generator K of Fig. 1. In normal operation the generator is filled with a solution of refrigerant in absorption liquid to a level about as indicated by reference character 51 (Fig. 3). In describing the arrangement shown in these figures we will designate, though without limitation, the cooling agent as ammonia; the absorption liquid as water (preferably distilled water); and the auxiliary agent as hydrogen. The generator is made of steel and has a heating pocket or chamber 52 situated in its lower portion, closed at the top, open at the bottom, welded to the generator shell proper as indicated at 53 and adapted to receive an electric heater unit or resistance 54.

Ammonia vapor expelled from solution in generator 50 passes through conduit 56 which corresponds to conduit 11 of Fig. 1 but, instead of passing direct to the condenser as in Fig. 1, passes through a cooling arrangement which we term a radiator. This radiator is designated by reference character 55. It includes the upper inclined portion of the relatively large conduit 56. One purpose of the radiator is to condense vapor of the absorption liquid, which vapor is steam in the instant case, and to return the condensate thus produced to the generator. It has been found that the introduction of water into the evaporator seriously disturbs the efficiency of evaporation. From the very nature of the operation the cooling agent must have a lower boiling point than the absorption liquid. Consequently, on decrease of temperature, the steam can be condensed without condensing the ammonia.

The cooling and condensation in the radiator is accomplished by means of flanges or fins 57. The fins are quadrangular flat plates in the embodiment shown. The shape is not, however, of importance. The principal features of the fins are a large heat radiating surface and good contact with conduit 56 so that heat may readily be transferred from the vapor within conduit 56 to the atmosphere. To obtain good contact, the fins are formed with collars 58 which surround conduit 56 and are firmly united thereto.

The atmosphere cools the fins; the fins cool conduit 56; and conduit 56, together with baffling members hereinafter described, condenses the steam therein. The condensed steam flows back through conduit 56, which is inclined downwardly toward the generator for this purpose, and thus the condensate returns to the generator.

In order to facilitate separation of water from the ammonia vapor and to increase the condensing effect, there is provided within conduit 56, opposite to the fins, a series of baffling disks or members 59, 60. Different reference characters are given alternately to the disks since one set of alternate disks (59) has apertures 61 on one side and the other set (60) has apertures 62 on the other side. This arrangement is shown in Figs. 9, 10 and 11, of which Figs. 9 and 10 show the individual disks and Fig. 11 is an assembly view taken on line 11—11 of Fig. 3. There is thus provided a tortuous path of flow for vapor through conduit 56 as a result of which an improved condensing effect is obtained. Both disks 59 and 60 are recessed in their lower portions, as shown at 63, 64 in Figs. 9 and 10, the recessed portions forming a passageway for flow of the condensed steam back to the generator. The baffling disks also serve to transmit heat from the fluid within the radiator to conduit 56 and to the atmosphere. They thus have a double function in the radiation process.

Reference character 65 designates generally the ammonia condenser which corresponds to condenser C of Fig. 1. Condenser 65 is composed of an outer water conduit 66 and an inner ammonia conduit 67. The space between the two conduits corresponds to the space within tank B of Fig. 1 surrounding condenser conduit C. The condenser is in the form of a distended coil of about two and a half loops. The size of condensing surface may be varied in accordance with the constituents used and the temperature of the cooling medium. The ends of conduit 66 are welded to conduit 67. The upper end of conduit 67 extends into conduit 56 as indicated at 68. The extension 68 is an additional precaution against entry of vaporized absorption liquid into the evaporator. The upper portion of conduit 67 beyond the upper end of conduit 66 corresponds to the condenser end of conduit 11 of Fig. 1. The radiator is, in effect, interposed in conduit 11 of Fig. 1. Conduit 69 is the cooling water supply conduit for condenser 65 and conduit 71 is the cooling water discharge conduit for the same.

After the ammonia has been condensed in condenser 65 it passes on through conduit 67 and into evaporator 70 which corresponds to evaporator G of Fig. 1. Conduit 67 after leaving the condenser passes within and through a larger conduit or pipe 72 which connects the upper part of absorber 75, (corresponding to absorber A of Fig. 1), with the upper part of evaporator 70. This conduit 72 corresponds to conduit M of Fig. 1. It is not necessary that conduit 67 pass within conduit 72 but this arrangement is used since, in the adaptation of the apparatus to a refrigerating cabinet or icebox, the generator, the radiator, the condenser, the absorber and their various connections are placed outside the main cooling space of the cabinet. Evaporator 70 is situated within the refrigerating space of the cabinet and there is a wall of insulation between the evaporator and the remaining parts of the refrigerating apparatus. The connections between the absorber and the evaporator and the connection between condenser 65 and the evaporator must pass through this wall and, in order to lessen the number of places of passage through the wall, conduit 67 is arranged to pass within conduit 72.

Reference character 100 designates the wall of a refrigerating cabinet. The refrigerating unit is supported upon a wall section 101. This section is composed of spaced plates between which there is a space filled with insulating material such as cork 102. Wall 100 is provided with an opening into which wall section 101 fits. The wall section may be secured within the opening by any desired means such as the screws 103. Evaporator 70 is situated on the inside of wall section 101, with respect to the cabinet, and is situated within a brine tank 104. This brine tank serves as an accumulator and distributor for cold. The generator, radiator and absorber are situated outside wall section 101, with respect to the cabinet, and these parts may, if desired, be enclosed within a suitable housing, preferably forming a portion of the cabinet.

At the point where conduit 67 opens into the evaporator and after it has left conduit 72 as is clearly shown in Fig. 4, this conduit 72 is bent downwardly. This is done to prevent passage of ammonia into pipe 72 and flow of ammonia into the absorber backwardly through pipe 72 without going through the evaporator to produce refrigeration.

The evaporator is of generally cylindrical formation and like other parts is preferably made of steel. The evaporator comprises an outer shell 74 in which there are a series of vertically posited plates or disks 76, 77. These disks correspond to the porous material E of Fig. 1. Two sets of reference characters are given to the disks because alternate disks are of different kind. As the liquid ammonia enters the evaporator from out of conduit 67 it is spread upon the uppermost disk which is designated by reference character 76, at substantially the center thereof, as clearly indicated in Fig. 6. Disk 76 is formed with an outer flange 83, bent downwardly as indicated in Fig. 8. This flange fits snugly against the shell 74, a good contact being obtained by drawing the assembled evaporator and thus pressing the shell tight against the disks. Each disk is of appreciable thickness in order to form an efficient metallic path of heat conduction into the evaporator from the shell and the surroundings of the evaporator. Disk 76 is formed with two oppositely disposed apertures 78 as shown in Figs. 6 and 8. These apertures serve for the passage of gas and are of appreciable size. Each aperture 78 is provided with an upwardly directed rim 79 which serves to prevent flow of liquid ammonia through the aperture. Rims 79 serve as retaining walls for reservoirs of liquid ammonia upon the disks. Disk 76 is provided with a relatively small opening 81 which may be said to be placed eccentrically with respect to apertures 78. This opening 81 is ordinarily not provided with a rim though it may be provided with a rim of less height than the rims 79 surrounding apertures 78. Fig. 13 shows an arrangement wherein opening 81 is provided with a rim 82 which is relatively low as compared to rims 79. Opening 81 is placed at an angle of 45° with respect to a center line drawn through the centers of apertures 78.

The first of disks 77, figured in downward direction, which lies directly under the uppermost disk 76 is also formed with two apertures 78 having rims 79 thereon. In assembled position, disk 77 is placed with its apertures 78 disposed at right angles to the apertures of disk 76. That is, a center line through apertures 78 of disk 76 lies at 90° to a center line through apertures 78 of disk 77. The small opening for passage of ammonia through disk 77 is designated by reference character 81$^a$ and is so situated that openings 81 and 81$^a$ are 180° apart in assembled position. Opening 81$^a$ is also arranged at an angle of 45° with respect to a center line drawn through apertures 78 in disk 77 but lies on the opposite side of its adjacent aperture as regards the corresponding relation of opening 81 to its adjacent aperture. It is thus seen that alternate disks are of different formation. Alternate disks have the same relative position within the evaporator and it will be seen that, with the disks arranged as described, a tortuous passageway is formed both for gas passing downwardly through the evaporator and for liquid passing downwardly through the evaporator. As liquid ammonia passes from one disk to the next lower disk it must travel around to the opposite side of that next lower disk before it can again pass downwardly.

The disks have a double purpose. In the first place they transmit heat and in the second place they form a large distributing surface whereby an effective evaporation is obtained. With the arrangement shown the gases are caused to contact the liquid intimately due to the opposed movement of fluids in tortuous paths.

Hydrogen enters the evaporator through conduit 72 in similar manner to the entry of hydrogen into the evaporator G of Fig. 1 from conduit M and diffusion of ammonia into hydrogen and evaporation of ammonia takes place in similar manner to that previously explained with reference to Fig. 1. A gas mixture is thus formed in the evaporator which passes through conduit 85 into the lower portion of the absorber 75. Conduit 85 corresponds to conduit N of Fig. 1.

In the absorber the ammonia is absorbed by absorption liquid supplied thereto from the generator, the principle of operation being the same, in general, as explained with reference to Fig. 1. The weak absorption liquid enters the absorber from conduit 86 which is connected to the upper portion of the absorber. The upper portion of the absorber above a disk therein designated by reference character 87 and between the shell 88 of the absorber and conduit 72 forms what may be termed a precooling chamber. This chamber is designated generally by reference character 89. Chamber 89 contains, besides the limiting disk 87, other disks 91 which are formed, as is also disk 87, with border flanges 92 firmly contacting with shell 88. These disks serve to transmit heat from the liquid in chamber 89 to the cooling jacket 93 which surrounds the absorber shell and which corresponds to the cooling space of tank B$^1$ in Fig. 1. Disks 87 and 91 are provided with small oppositely disposed openings designated by reference character 94.

The weak absorption liquid passing to the absorber is first precooled in precooling chamber 89 due to the dissipation of heat to the water within cooling jacket 93. The purpose of thus lowering the temperature of the absorption liquid before it enters the main absorbing section of the absorber is to decrease the partial vapor pressures of the absorption liquid and such amount of cooling agent as may be dissolved therein. With the selected fluids, the weak absorption liquid passing into chamber 89 consists of water with ammonia dissolved therein though the amount of ammonia dissolved in the water is small compared to the amount of ammonia dissolved in the water passing from the absorber to the generator. If the weak absorption liquid were admitted direct to the absorber, the hydrogen which is liberated in the absorber would so to speak pick up a rather appreciable amount of water vapor and ammonia vapor. This ammonia and steam would be carried with the hydrogen on its passage to the evaporator through conduit 72. The result, (particularly of the influence of the introduction of steam into the evaporator), would be a decrease of evaporating efficiency. By precooling the absorption liquid before its entry into contact with the gas mixture introduced into the absorber through conduit 85, the temperature and vapor pressure of the absorption liquid is reduced to such an extent that a much smaller and substantially insignificant amount of vapor of the absorption liquid is entrained into the fluid flowing through conduit 72. Furthermore this precooling gives a more intensive absorbing effect.

The space enclosed between the lower part of shell 88 and disk 87 constitutes the absorbing space. This absorbing space which, in effect, is the true absorber, since the precooling function is independent of the absorbing function, is designated by reference character 105. The precooling function can be obtained in other manners than as shown and described. Absorber space 105 is provided with a series of plates or disks 106 and 107 which serve to transmit heat and to provide a large surface of gas and liquid contact as is the function of the disks 76 and 77 in the evaporator. Disks 106 and 107 are provided with apertures 108 for the passage of gas and with openings for the passage of liquid which are similar to openings 81 and 81ª of Figs. 6 and 7 and which are disposed with different relation to apertures 108 for alternate disks. One absorber disk 106 is shown in Fig. 12 having an opening 109 for passage of absorption liquid. The disks are made with upturned flanges 110 in contrast to the downwardly turned flanges of disks 76 and 77. The reason that the flanges are directed differently than on the disks used in the evaporator is simply for convenience in assemblage of parts. It will be seen that absorption liquid entering space 105 flows in a tortuous path, downwardly, from disk to disk and is brought into intimate contact with the mixture of ammonia and hydrogen which enters the absorber from conduit 85. The absorption liquid absorbs the ammonia, liberating the hydrogen, and the hydrogen flows upwardly through conduit 72 and back into the evaporator. The automatic circulation of hydrogen is thus produced in a manner similar to that explained with reference to Fig. 1. As in Fig. 1, the circulation is increased due to the colder temperature prevailing in the evaporator than in the absorber.

Cold water is supplied to cooling jacket 93 by means of conduit 111. After the cold water has circulated through cooling jacket 93 it passes on through conduit 69 and into condenser 65.

In this modification circulation between the generator and absorber is effected in the following manner:

The lower part of the absorber which contains strong absorption liquid is connected with a conduit 112. This connection is made through a passageway 113 within a filling member 114. Conduit 112 is formed into several distended loops which encircle the filling member 114 and the heating pocket 52. This conduit 112 then forms a coil which is indicated by reference character 115, which coil encircles heating pocket 52 and is set into grooves cut in the same, the purpose of the latter arrangement being to give good heat transfer to this coil. The conduit is extended upwardly beyond coil 115 as designated by reference character 116 and opens into the upper part of generator 50 above the level of absorption liquid therein. Surrounding the major portion of conduit 112 is a conduit 117 which is welded at its ends to conduit 112 as indicated by reference character 118. A conduit 119 connects the lower part of generator 50 with one end of conduit 117 and the other end of conduit 117 is connected to conduit 86 which, in turn, is connected to precooling chamber 89.

Heat is transmitted from resistance 54 to coil 115 and causes formation of vapor there in. This lightens the upwardly extending column of liquid within coil 115 and conduit 116 so that this upwardly extending column becomes relatively lighter than the column of liquid measured by the height of liquid in the absorber relative to the position of coil 115 and thus liquid passes upwardly through coil 115 and conduit 116 into generator 50. Supply of absorption liquid to the generator causes a higher level of liquid in the generator than in the absorber and liquid flows by gravity through conduits 119, 117 and 86, from the generator to the absorber. There is thus produced a continuous circulation of absorption liquid between the generator and absorber due to the application of heat to coil 115, which is, in effect, an auxiliary generator.

The purpose of arranging conduit 112 within conduit 117 is to transfer heat from the weak absorption liquid passing from the warm generator to the colder absorber into the liquid passing in the opposite direction from the colder absorber to the warmer generator. This arrangement gives an appreciable saving in heat. In order to obtain maximum efficiency of heat transfer the arrangement is made on the principle of counterflow.

Filling member 114 includes a plug 123 which has passageways through the same and which can be unloosened to give communication with the atmosphere or with a filling apparatus. A cap 124 is placed upon the filling member for protection. This member is arranged to coact with a filling apparatus. A form of filling apparatus suitable for this refrigerator is described and claimed in our copending application Serial No. 70,649, filed November 21, 1925. Various forms of filling apparatus may be used depending upon the particular fluids which are used.

Care should be taken that the proper proportions of fluids are used since definite proportions of particular fluids give the best results under any given set of operating circumstances. The proportions of the fluids are determined by the form, size and shape of the apparatus, the desired temperature of operation of the evaporator and the temperature of the cooling water or other cooling medium used, that is, the temperature of those parts of the absorber and condenser which give off heat. The proportions of the fluids should be so selected that, under the conditions for which the apparatus is designed to operate, a minimum amount of heat supply will be necessary. A very important factor, with the apparatus herewith described, is the relation of the ammonia to water, that is the concentration of the ammonia solution. If this concentration is too high, the result will be that the auxiliary agent carries too much ammonia vapor from the absorber to the evaporator, for a given reasonably low rate of circulation of the auxiliary agent, so that it is difficult for the hydrogen, already heavily laden with ammonia vapor, to pick up further ammonia in the evaporator. The result is therefore a decrease of the cooling effect. On the other hand if the concentration is too low it requires too great an amount of heat to expel the ammonia from the solution and thus the efficiency of the apparatus is impaired. The quantity of auxiliary gas in the apparatus is determined by its pressure and its pressure must have a relation to the temperature of condensation of the ammonia.

A preferred proportion of fluids which gives high efficiency with the apparatus herewith dealt with for an evaporator temperature of approximately 25° F. (in the brine tank) and a cooling water temperature (at the inlet to the absorber) of about 65° F., is 36% ammonia to absorption liquid with a quantity of hydrogen sufficient to raise the pressure to about 130 lbs. per square inch gage without heat applied.

The drawings of the apparatus shown in Fig. 2 and supplemental figures are made to scale. The generator 50 is, in the working machine, about fifteen inches long and about two inches internal diameter. The dimensions for the remainder of the parts can be determined from these data. This apparatus, after being carefully cleaned, is filled with 1.2 liters (1.27 qts.) of ammonia solution, that is ammonia dissolved in water, of which the specific gravity is 0.88. The ammonia solution is introduced into the apparatus under vacuum with the apparatus as nearly empty as possible. After this amount of ammonia solution has been introduced hydrogen is forced into the apparatus until the pressure is approximately 130 lbs. The apparatus, after being filled, should be tightly sealed.

Although our apparatus develops vapor under pressure, it is impossible for the pressure within the same to rise above predetermined limits, even though electricity be supplied to heating unit 54 and the cooling water be cut off from cooling jacket 93 and the space between conduits 66 and 67. That is, under the most extreme conditions, our apparatus is entirely safe. Although no safety valve or other safety mechanism is provided to prevent excess accumulation of pressure, it is impossible for our apparatus to rupture or explode. The apparatus is its own safety mechanism and it will not allow outside influences to creat damage to it. The maximum pressure which can be obtained can be regulated as will now be explained. Obviously the maximum pressure will be obtained when, as stated, the supply of heat is maintained at maximum intensity while the cooling liquid for the absorber and condenser is entirely shut off. If the supply of cooling water should accidentally stop and the heat should continue to vaporize ammonia in the generator, condenser 65 would no longer be a condenser and the whole apparatus would become a vapor generator of continuously rising pressure. The fins 57 are an important factor in regulating the maximum pressure to which the apparatus can rise. The fins, by their number taken in connection with the area of each and other factors of heat conduction and radiation, as will be apparent to the person skilled in the art, serve as a component factor of the amount of surface of the refrigerating apparatus as a whole which is exposed to atmospheric temperature. Where the generator and the heat exchanger between the generator and the absorber are enclosed in non-conducting material such as designated by reference character 121 in Fig. 3, this factor must be taken into consideration.

In this connection we make use of the relation expressed in the following formula:

$$Q = k.S(t_1 - t_2)$$

In this formula:

Q represents the quantity of heat supplied to the refrigerating apparatus by means of heating element 54 or any other heat supply used;

$k$ represents a constant of heat transmission from metal to air. This constant can be readily determined for the particular apparatus;

S represents the surface of the apparatus which is exposed to atmosphere;

$t_1$ is the temperature corresponding to the pressure within the apparatus which is predetermined as that limit above which the pressure shall not rise;

$t_2$ represents the temperature of the atmosphere and should be calculated for that temperature which is the highest at which the refrigerating apparatus will operate.

Having given the maximum limit pressure. the factor $t_1$ can be determined. Knowing the values of Q, $k$ and $t_2$, the above equation can be solved to give S. Having found S to be a given number of square inches or square feet it is a matter of mathematical calculation to determine that portion of the surface of the apparatus which must be in contact with atmosphere. The apparatus being supplied with the amount of surface thus determined, which may be regulated by surface such as pins 57, the pressure in the refrigerating apparatus can never rise above the predetermined pressure used for solving the equation. Taking into consideration the strength of the materials used in the manufacture of the apparatus, a limit safety pressure can be predetermined which will fall so far within the limits of stress of the material used that there never can be any danger of rupture or explosion of the apparatus.

The safety arrangement thus evolved has been made the subject matter of practical test and it has been found that with a certain number of fins of a given unit area the temperature and pressure will rise to a given level and no further rise is possible.

One apparatus was tested as follows:

The apparatus was arranged without insulation and was filled with the proper solution of ammonia in water and with hydrogen to a pressure of 9 kg. per cm.$^2$ absolute (about 110 lbs. per sq. in. gage) and was started as usual. The pressure was tested by means of a pressure gage which was retained on the apparatus throughout the test. The apparatus functioned normally at a pressure of 12.5 kg. per cm.$^2$ absolute (about 160 lbs. per sq. in. gage). The cooling water for the jackets surrounding the absorber and the condenser was then shut off and the pressure rose to 18 kg. per cm.$^2$ (about 240 lbs. per sq. in. gage). This last pressure proved to represent equilibrium. The apparatus was kept under these conditions of heat applied but without heat extraction for twelve hours. The generator and heat exchanger between the generator and absorber were then insulated but the evaporator was kept uninsulated. The pressure then rose to a new equilibrium of 23 kg. per cm.$^2$ absolute (about 310 lbs. per sq. in. gage). The temperature in the generator increased to 122° C. (about 252° F. normal temperature). The temperature of the evaporator rose to 50° C. (122° F.). The supply of electric current was measured and found to be 290 watts. After the apparatus had operated in this way for twelve hours, the cooling water was again turned on whereupon the apparatus resumed its normal functioning in a few minutes.

It will have been noticed from the above description that in each of the modifications described, circulation is caused in a plurality of circuits by forces which are built up wholly within the system. As has been explained with reference to Fig. 1, circulation is obtained in the absorber-evaporator cycle by formation of a pressure gradient. The force producing circulation of the auxiliary agent between the evaporator and the absorber is wholly generated within the system, making it unnecessary to carry kinetic energy into the apparatus through a moving part passing through the wall or shell of the apparatus. In both the modifications described described the pressure gradient rises in the path of flow downwardly in the evaporator. After the fluid has entered the absorber, the pressure gradient decreases and is dissipated in the path of flow upwardly through the absorber. The formation of the pressure gradient is caused wholly within the system by factors within the system. In the generator 50 and the generator K of Fig. 1 a pressure gradient is continuously built up which serves to force vapor into the condenser, from which it passes to the evaporator. This pressure gradient may be considered as collateral to that in the absorber-evaporator cycle. The pressure gradient in the absorber-evaporator cycle would not be built up and dissipated except for the collateral aid of the pressure gradient in the generator in causing the introduction of the liquid ammonia into the evaporator.

It is obviously possible to select substances such that the mixture of cooling agent and auxiliary agent in the evaporator is lighter than the auxiliary agent itself in the absorber. In this case the circulation through the absorber and evaporator would be in the opposite direction to that above described. In such case the pressure gradient would be built up within the absorber. The relative difference of temperatures between the evaporator and absorber would work against the effect of difference in specific weights of the vertically extending bodies within these vessels. However, as the influence of the former effect is small in comparison to the latter effect, this arrangement may well be used when, for example, it is desired to place the evaporator at a lower level than the absorber.

Obviously instead of simple substances such as hydrogen, combined substances or mixtures of substances may be used.

In Figs. 14, 15 and 16 we have shown a modification of the connection between the evaporator and the absorber. This modification is more or less similar to the arrangement of Fig. 1. A cylindrical heat exchanger 130 corresponding to the concentrically arranged portions of conduits M and N in Fig. 1 is provided between the absorber and evaporator. This heat exchanger is divided into two end chambers 131 and 132 and a central chamber 133. Division between these chambers is made by tube heads 134 and 135 between which extend tubes 136 affording communication between chambers 131 and 132. Chamber 131 is connected with the upper part of the absorber. Since the conduit forming this connection is equivalent to a portion of conduit 72 it has been given the reference character 72$^a$. Chamber 132 is connected with the upper part of the evaporator by means of conduit 72$^b$. Central chamber 133 is connected, at one end, with the bottom part of the evaporator by means of a conduit 85$^a$ and, at the other end, to the bottom part of the absorber by means of conduit 85$^b$. With this arrangement heat is transferred from the fluid passing from the relatively warm absorber into the fluid coming from the relatively cold evaporator. An appreciable saving of heat is thus effected. The action is similar to that in the heat transfer between pipes M and N of Fig. 1. Since some vapor of absorption liquid is carried through conduit 72$^a$, openings 138 are formed in the lower extremities of tube heads 134 and 135. Should liquid enter chambers 131 and 132, it will drain through the openings 138 into chamber 133 and thence to the absorber.

The operation of the arrangement shown in Figs. 14, 15 and 16 will be readily apparent from the above description.

While we have shown the heat exchanger between the generator and absorber in Figs. 1, 2 and 14, arranged so that flow through conduit L is always horizontally and upwardly and flow through conduit 117 is upward, this heat exchanger may obviously be arranged in other ways. To illustrate, Fig. 1$^a$ shows the heat exchanger comprising conduits L and P as inverted, with respect to Fig. 1. In Fig. 1$^a$, conduit P, as it leaves the absorber A, extends, first, directly downwardly, to some distance below the absorber, and then loops upwardly toward the coil T. In this modification, the flow through conduit L is, in general, downward, for the greater extent of the heat exchanger.

We have discovered that, for effective operation it is necessary that, for each unit per weight of ammonia evaporated, and consequently generated, at least 0.4 unit by weight of hydrogen, that is the weak gas, must pass into the evaporator. Furthermore we have discovered that, for efficient operation it is necessary that at least 3 units per weight of weak liquor pass to the absorber for each unit per weight of ammonia to be absorbed.

An apparatus according to this invention should be so designed and built that the circulation producing forces are amply sufficient to overcome such forces as reactionary friction forces, reactions due to curves and abrupt changes in paths of flow as well as for the lifting of the fluids of circulation. With the types of absorber-evaporator circuit shown in Figs. 2–14, the uppermost disk in the evaporator should be placed some distance below the entrance of conduit 72 into the evaporator so that the proper circulation is at all times obtained.

While our invention involves various novel features it is to be understood that individual features may be used in combination with alternative constructions and that individual features may be modified, and yet fall within the scope of the invention, and that the invention is not limited to the embodiments described but is to be gaged by the state of the prior art taken in connection with the appended claims.

Having thus described our invention, what we claim is:

1. That improvement in the art of refrigerating by the aid of a system containing refrigerant fluid and additional fluid for equalizing pressure which consists in generating force within the system and circulating said additional fluid in said system due to said force.

2. A process of refrigerating which comprises evaporating a liquid cooling agent in the presence of an auxiliary agent, producing a head due to difference in specific weights of a mixture of the vapor of the cooling agent and the auxiliary agent on the one hand and the auxiliary agent on the other hand, forcing the mixture of the cooling agent and auxiliary agent into the presence of an absorption liquid under the influence of the head produced, absorbing the cooling agent in the absorption liquid, withdrawing the absorption liquid from the presence of the auxiliary agent, returning the auxiliary agent into the presence of the cooling agent under the influence of the head produced, heating the absorption liquid and expelling the cooling agent from solution, returning the absorption liquid into the presence of the mixture, condensing the cooling agent and returning the condensed cooling agent into the presence of the auxiliary agent.

3. A continuous process of refrigerating which comprises expelling a cooling agent from a solution thereof in a main body of absorption liquid, condensing the cooling agent, evaporating the condensed cooling agent in the presence of an auxiliary agent, producing a head due to difference in specific weights of a mixture of the vapor of the cooling agent and the auxiliary agent on the one hand and the auxiliary agent on the other hand, continuously separating weakened absorption liquid from the main body, forcing the mixture of cooling agent and auxiliary agent into the presence of the separated absorption liquid under influence of the head produced and thus causing absorption of the cooling agent and liberation of the auxiliary agent, returning the auxiliary agent into the presence of the cooling agent under influence of the head produced, and returning the separated absorption liquid containing cooling agent to the main body of absorption liquid.

4. That step in refrigerating through the agency of a generator-condenser-evaporator-absorbed cycle which consists in circulating an auxiliary agent through the evaporator and absorber exclusively by difference in specific weights of a mixture of the evaporated cooling agent and the auxiliary agent on the one hand and the auxiliary agent on the other hand.

5. A process of refrigerating which comprises evaporating a liquid cooling agent in the presence of a gas of appreciably lower specific weight than the specific weight of the vapor of the cooling agent, producing a head due to difference in specific weights, forcing the mixture of cooling agent and gas produced into the presence of an absorption liquid under influence of the head produced, segregating the cooling agent from the gas by absorption and returning the gas into the presence of the cooling agent under influence of the head produced.

6. A process of refrigerating through the agency of a generator-condenser-evaporator-absorber cycle which consists in expelling a cooling agent from solution in absorption liquid in the generator, condensing the cooling agent, evaporating the condensed cooling agent in the presence of an auxiliary agent, producing a head due to difference in specific weights of different vertically arranged bodies in the cycle, forcing the mixture of cooling agent and auxiliary agent into the presence of absorption liquid in the absorber under the influence of the head produced, returning the auxiliary agent into the presence of the cooling agent under the influence of the head produced and circulating absorption liquid between the generator and absorber.

7. That improvement in the art of refrigerating through the agency of an absorption system including an evaporator and an absorber connected to afford a cycle of circulation between them which consists in diffusing a plurality of fluids in the presence of each other in the evaporator, continuously building up a pressure gradient within the cycle under the influence of factors within the system and continuously dissipating the pressure gradient and thereby producing circulation between the absorber and evaporator.

8. A process of refrigerating through the agency of an absorption system which comprises diffusing a plurality of fluids in the presence of each other and thus absorbing heat, producing a head within the system due to difference in specific weights of different vertically arranged bodies in the system, forcing the mixture of fluids into the presence of absorption liquid under influence of the head produced and thereby liberating one fluid while absorbing a second fluid, separating the absorption liquid from the liberated fluid, heating the absorption liquid to expel the second fluid, returning the liberated fluid to the presence of its complementary fluid of diffusion to again diffuse thereinto under influence of the head produced and returning the second fluid into the presence of its complementary fluid of diffusion under influence of the heat applied, while condensing fluid on its way to diffusion.

9. A process of refrigerating through the agency of an absorption system which comprises diffusing a plurality of fluids in the presence of each other and absorbing heat, continuously building up a pressure gradient within the system under the influence of factors within the system, dissipating the pressure gradient and thereby forcing the mixture of diffused fluids into the presence of absorption liquid whereby one fluid is liberated and a second fluid absorbed, separating the absorption liquid from the liberated fluid, heating the absorption liquid to expel the second fluid and to produce a pressure gradient collateral to the first mentioned pressure gradient, returning the liberated fluid to the presence of the companion fluid of diffusion under the influence of continued dissipation of the first pressure gradient and returning the fluid expelled from the absorption liquid into the presence of its companion fluid of diffusion, while condensing fluid on its way to diffusion.

10. A process of refrigeration which comprises expelling a volatile cooling agent from a solution thereof in a main body of less volatile solvent, condensing the cooling agent, passing the condensed cooling agent and a gas which has a different specific gravity than that of the vapor of the cooling agent vertically over obstructions in a space to be refrigerated to evaporate the condensed cooling agent, washing the mixture of vapor of cooling agent and the gas with some of the solvent above mentioned separated from the main body of solvent while cooling the same in order to separate the cooling agent from the gas, returning the gas into the space to be refrigerated, returning the separated solvent to the main body of solvent and again expelling the cooling agent from solution while performing the entire circulation action by the differences in gravity produced by the above mentioned steps, and the pressure of the entire system being substantially constant.

11. Those steps in refrigerating through the agency of an absorption system including an evaporator and an absorber which consist in diffusing a cooling agent in the presence of an auxiliary agent in the evaporator and circulating the auxiliary agent through the evaporator and absorber exclusively by difference in specific weights of vertically extending bodies of fluid in the system.

12. That improvement in the art of refrigerating by the aid of a system including an evaporator and containing a plurality of cooperating substances and an additional substance for equalizing pressure which consists in generating force within the system and continuously circulating a plurality of substances into and out of the evaporator due to said force.

13. That improvement in the art of refrigerating through the agency of an absorption system including an evaporator and an absorber connected to afford a cycle of circulation between them and containing refrigerant fluid and additional fluid for equalizing pressure which consists in generating a force within the system and producing circulation between the absorber and evaporator due to said force.

14. That improvement in the art of refrigerating through the agency of an absorption system including an evaporator and an absorber connected to afford a cycle of circulation between them and containing a plurality of cooperating agencies in the evaporator, which consists in generating a force within the system and producing circulation between the absorber and evaporator due to said force.

15. That improvement in the art of refrigerating through the agency of an absorption system including an evaporator and an absorber connected to afford a cycle of circulation between them and containing a plurality of cooperating agencies in the evaporator, which consists in generating force wholly within the system and producing circulation between the absorber and evaporator due to said force.

16. That improvement in the art of refrigerating through the agency of an absorption system including an evaporator and an absorber connected to afford a cycle of circulation between them which consists in diffusing a plurality of substances in the presence of each other in the evaporator, generating a force within the cycle wholly under the influence of factors within the system and producing circulation between the absorber and evaporator due to said force.

17. Those steps in refrigerating through the agency of an absorption system including an evaporator and an absorber which consist in diffusing a plurality of fluids in the presence of each other in the evaporator and circulating fluid through the evaporator and absorber by force developed due to difference in specific weights of vertically extending bodies of fluid in the system.

18. That improvement in the art of refrigerating through the agency of an absorption system including an evaporator and an absorber connected to afford a cycle of circulation between them and containing refrigerant fluid and additional fluid for equalizing pressure which consists in cooling said additional fluid and circulating said additional fluid between the absorber and evaporator due to the effect produced on said additional fluid by said cooling.

19. That improvement in the art of refrigerating through the agency of an absorption system including an evaporator and an absorber connected to afford a cycle of circulation between them and containing refrigerant fluid and additional fluid for equalizing pressure which consists in heating said additional fluid and circulating said additional fluid between the absorber and evaporator due to the effect produced on said additional fluid by said heating.

20. Refrigerating apparatus comprising a generator, a condenser, an evaporator, an absorber, means to interconnect the generator, condenser, evaporator and absorber, said means including communications between the absorber and evaporator arranged to form a circuit, said circuit being arranged to contain vertically extending bodies of fluid of such nature that circulation is caused to take place within said circuit due to difference in specific weights of different vertically extending bodies.

21. Refrigerating apparatus comprising a generator, a condenser, an evaporator and an absorber arranged in a circuit, means to conduct gas from the lower part of the evaporator to the absorber and means to conduct gas from the absorber to the upper part of the evaporator.

22. Refrigerating apparatus comprising a generator, a condenser, an evaporator space and an absorbing space arranged in a circuit and means to move gases vertically through said spaces in opposite directions.

23. Refrigerating apparatus comprising a generator, a condenser, an evaporator and an absorber forming a circuit for a cooling agent, a second circuit for an auxiliary agent including the evaporator and absorber and means motivated by difference in specific weight of the cooling agent and the auxiliary agent to move the cooling agent and the auxiliary agent downwardly in the evaporator and from the evaporator into the absorber, to move the auxiliary agent upwardly in the absorber and from the absorber to the evaporator.

24. Refrigerating apparatus comprising a generator containing a cooling agent in solution and including means to expel the cooling agent from the solution, a condenser receiving vapor from the generator and condensing the same, an evaporator supplied with condensate from the condenser and containing an auxiliary agent in the presence of which the condensate evaporates and of appreciably lower specific weight than the evaporated cooling agent, an absorber, means to circulate a liquid between the generator and the absorber and circulation means between the evaporator and absorber arranged to permit the mixture of cooling agent and auxiliary agent in the evaporator to flow downwardly and thence to the absorber where the cooling agent is absorbed by the liquid, and the auxiliary agent to flow upwardly in the absorber and thence into the evaporator.

25. Refrigerating apparatus comprising a generator, a condenser, an evaporator, an absorber, said evaporator and absorber being arranged independently of each other, and a plurality of pipes connecting said evaporator and absorber to form with said evaporator and said absorber a closed circuit for an auxiliary agent in the presence of which the cooling agent evaporates.

26. A refrigerating system comprising a generator, an evaporator containing a plurality of substances adapted to have complementary diffusion and to produce refrigeration, an absorber for separating the fluids of diffusion, condensing means, connecting conduits between the elements of the system to form a plurality of circuits of circulation including an absorber-evaporator cycle and means for continuously building up a pressure gradient within said cycle under the influence of factors within the system to produce circulation of fluids between the absorber and evaporator by continuous dissipation of the pressure gradient.

27. A refrigerating system comprising an evaporator containing a plurality of fluids adapted to diffuse into each other and absorb heat to produce refrigeration, an absorber, a conduit for conducting the mixture of diffused fluids from the evaporator to the absorber, a generator, a conduit for conducting weak absorption liquid from the generator to the absorber whereby one fluid is absorbed and a second fluid liberated in the absorber, a conduit for conducting the liberated fluid from the absorber to the evaporator, means for continuously building up a pressure gradient within the system under the influence of the factors within the system and for circulating fluid between and through the evaporator and absorber under the influence of the pressure gradient, means to conduct strong absorption liquid from the absorber to the generator, condensing means connected in the system for condensing fluid on its way to diffusion in the evaporator, and means to expel fluid from solution in the generator and to produce a pressure gradient collateral to the first mentioned pressure gradient to return the fluid expelled from the absorption liquid into the evaporator.

28. That improvement in the art of refrigerating which consists in evaporating a cooling agent to produce refrigeration, introducing the evaporated cooling agent into the presence of an absorbent body of absorption liquid, removing absorption liquid thus enriched with the cooling agent from the presence of the evaporated cooling agent, expelling vapor from the enriched absorption liquid thus removed by application of heat and thus producing a motivating force, moving the removed enriched absorption liquid into a main body of absorption liquid and back to said absorbent body of absorption liquid under the influence of the force thus produced, causing a second expulsion of vapor in said main body to expel cooling agent from said main body in vaporous form, condensing the cooling agent last vaporized and again evaporating the same to produce refrigeration.

29. A refrigerator comprising a generator, a condenser, an evaporator, an absorber, means to interconnect the generator, evaporator and absorber to maintain the same total pressure therein, said refrigerator including a conduit communicating with the generator and the absorber to conduct absorption liquid from the generator to the absorber, a second conduit communicating with the absorber and generator to conduct absorption liquid from the absorber to the generator, said second conduit being in communication with said generator at a point higher than the point of communication of the first mentioned conduit with the generator, said second conduit having an upwardly extending portion and means to heat said upwardly extending portion.

30. Refrigerating apparatus comprising a generator, a condenser, an evaporator, an absorber, a conduit for absorption liquid connecting the lower part of the generator with the upper part of the absorber, a conduit for absorption liquid connecting the lower part of the absorber with the upper part of the generator, the last mentioned conduit having an upwardly extending portion and means to heat the upwardly extending portion.

31. Refrigerating apparatus comprising a generator, a condenser, an evaporator, an absorber, a conduit for absorption liquid connecting the lower part of the generator with the upper part of the absorber, a conduit for absorption liquid connecting the lower part of the absorber with the upper part of the generator, the last mentioned conduit having an upwardly extending portion and a common source of heat for said generator and said upwardly extending portion.

32. Refrigerating apparatus comprising a generator, a condenser, an evaporator, an absorber, means to interconnect the generator, condenser, evaporator and absorber to maintain the same total pressures therein, said refrigerating apparatus comprising a coil, means to connect the lower end of the coil with the absorber, means to connect the upper part of the coil with the generator and means to heat the coil.

33. Refrigerating apparatus comprising a generator, a condenser, an evaporator, an absorber, means to interconnect the generator, condenser, evaporator and absorber to maintain the same total pressures therein, said refrigerating apparatus comprising a coil, means to connect the lower end of the coil with the absorber, means to connect the upper part of the coil with the generator and a common source of heat for said generator and said coil.

34. Refrigerating apparatus comprising a generator containing absorption liquid, a condenser, an evaporator, an absorber containing absorption liquid, the level of liquid in the absorber during active operation being lower than the level of the liquid in the generator, a vertically arranged coil, means to connect the upper end of the coil with the upper part of the generator, means to connect the lower end of the coil with the lower part of the absorber, means to supply heat to said coil and to said generator and means connecting the lower part of the generator with the upper part of the absorber.

35. A refrigerator comprising a generator, a condenser, an evaporator, an absorber, means to conduct gas from the lower part of the evaporator to the absorber, means to conduct gas from the absorber to the upper part of the evaporator, a liquid circulation circuit between the generator and absorber having an upwardly extending portion and means to generate vapor in the upwardly extending portion.

36. Refrigerating apparatus comprising a generator, a condenser, an evaporator, an absorber, conduits connecting said generator and said absorber to form a circuit of circulation for absorption liquid therebetween, means to heat said generator and auxiliary vapor producing means independent of said generator for causing circulation within said circuit.

37. Those steps in refrigerating through the agency of an absorption system including a generator, a condenser, an absorber and an evaporator, which consists in vaporizing a cooling agent by expelling the same from absorption liquid in the generator, condensing the cooling agent, evaporating the cooling agent in the presence of an auxiliary agent in the evaporator, circulating the auxiliary agent through the evaporator and absorber, forming a stream of absorption liquid leading from the generator to the absorber and a second stream leading from the absorber to the generator, heating said second stream and forming vapor of fluid thereof before its entry into the generator by application of heat and causing movement of said streams due to the last-mentioned production of vapor.

38. A refrigerating system including a condenser, an evaporator, an absorber, said condenser, evaporator and absorber being connected to form a system for evaporating a cooling agent in the presence of an auxiliary agent and means for producing circulation in said system including a generator for producing vapor to be condensed and evaporated in a major cycle and an auxiliary vaporizing element independent of the generator for circulating fluid in a local cycle and means to heat said generator and heat said auxiliary vaporizing element.

39. Those steps in refrigerating through the agency of a generator-condenser-evaporator-absorber cycle which consist in circulating an auxiliary agent through the evaporator and absorber exclusively by difference in specific weights of a mixture of the evaporated cooling agent and the auxiliary agent on the one hand and the auxiliary agent on the other hand, and circulating an absorption liquid between the generator and absorber exclusively by change of specific weight due to application of heat to the absorption liquid.

40. Refrigerating apparatus comprising a generator containing a cooling agent in solution in an absorption liquid, a condenser, an evaporator and an absorber forming with the generator a major circuit for the cooling agent, a second circuit constituting a local circuit including the evaporator and absorber wherein a pressure gradient motivated by difference in specific weight of the cooling agent and the auxiliary agent is utilized to move the cooling agent and auxiliary agent within the evaporator, from the evaporator to the absorber, to move the auxiliary agent within the absorber and return the same to the evaporator, a third circuit also constituting a local circuit and including the generator, the absorber, a conduit extending from the absorber to the generator and having an upwardly extending portion, and means to heat the upwardly extending portion to move absorption liquid from the absorber to the generator and cause circulation in the third circuit under the sole influence of difference in specific weights in the absorption liquid produced by heating the upwardly extending portion.

41. A process of refrigerating which comprises evaporating a liquid cooling agent in the presence of an auxiliary agent, producing a head due to difference in specific weights of a mixture of the vapor of the cooling agent and the auxiliary agent on the one hand and the auxiliary agent on the other hand, forcing the mixture of cooling agent and auxiliary agent into the presence of an absorption liquid under the influence of the head produced, absorbing the cooling agent in the absorption liquid, returning the auxiliary agent into the presence of the cooling agent under the influence of the head produced, producing a head by application of heat, withdrawing the absorption liquid from the presence of the auxiliary agent by this last head produced, expelling the cooling agent from the absorption liquid thus withdrawn, returning the absorption liquid to the presence of the mixture, condensing the expelled cooling agent and again evaporating the same to produce refrigeration.

42. A refrigerating system comprising a generator, a condenser, an evaporator containing a plurality of substances adapted to have complementary diffusion and to produce refrigeration, an absorber for separating the fluids of diffusion, condensing means, connecting conduits between the elements of the system to form a plurality of circuits of circulation including a local cycle between the absorber and evaporator, means for continuously building up a pressure gradient within said cycle under the influence of factors within the system to produce circulation of fluid between the absorber and evaporator by continuous dissipation of the pressure gradient, a major cycle including the generator, the condenser, the absorber and the evaporator wherein a second pressure gradient is continuously formed and dissipated to produce a major circulation, and a local cycle of circulation between the generator and the absorber and an auxiliary generator interposed in the last mentioned local cycle for causing a thermosiphon effect within the same for circulating absorption liquid between the absorber and the generator.

43. A continuous process of refrigerating which comprises expelling a cooling agent from a solution thereof in a main body of absorption liquid, condensing the cooling agent, evaporating the condensed cooling agent in the presence of an auxiliary agent, producing a head due to difference in specific weights of a mixture of the vapor of the cooling agent and the auxiliary agent on the one hand and the auxiliary agent on the other hand, continuously separating weakened absorption liquid from the main body, forcing the mixture of cooling agent and auxiliary agent into the presence of the separated absorption liquid under influence of the head produced and thus causing absorption of the cooling agent and liberation of the auxiliary agent, returning the auxiliary agent into the presence of the cooling agent under influence of the head produced, withdrawing the separated absorption liquid containing cooling agent from the presence of the auxiliary agent in the form of a stream, heating the stream and generating vapor therein, and mixing the vapor last mentioned with the vapor resulting from the first expulsion of cooling agent from solution and conducting the remaining liquid of the stream into said main body under influence of head resulting from heating the stream.

44. Refrigerating apparatus comprising a generator, a condenser, an absorber, and an evaporator connected to form a circulating system for a refrigerating process and including a conduit for conducting absorption liquid from the generator to the absorber, a conduit for conducting absorption liquid from the absorber to the generator, said conduits being arranged in heat exchange relation and means for conducting a cooling fluid extraneous to the substances within the refrigerating apparatus into heat exchange relation with the absorption liquid passing into the absorber after its exchange of heat with the liquid flowing from the absorber to the generator.

45. Refrigerating apparatus comprising a generator, a condenser, an absorber, and an evaporator connected to form a circulating system for a refrigerating process and including a heat exchanger having separated spaces, a conduit connecting the generator with one space of the heat exchanger, a second conduit connecting the same space with the absorber, a third conduit connecting the absorber with the other space of the heat exchanger, a fourth conduit connecting the said other space of the heat exchanger with the generator, means to cause flow of absorption liquid through said conduits and a common source of cooling for the absorber and said second conduit.

46. Refrigerating apparatus comprising a generator, a condenser, an evaporator and an absorber connected to form a circulating system, said absorber containing a series of superimposed members, some of said members being arranged to form a chamber, means to conduct liquid from said generator to said chamber, cooling means in heat exchange relation with said chamber and means to conduct liquid from said chamber into the absorption space of the absorber.

47. Refrigerating apparatus comprising a generator, a condenser, an evaporator and an absorber connected to form a system in which a cooling agent and an auxiliary agent circulate through the evaporator and the auxiliary agent circulates through the absorber, said absorber containing a plurality of superimposed metal members having holes in the same, the uppermost of said members being arranged to form a chamber separate from the absorption space of the absorber, means to conduct liquid from said generator to said chamber, means to conduct liquid from said chamber into the absorption space of the absorber and a cooling jacket surrounding the absorption space and said chamber.

48. Refrigerating apparatus comprising a generator, a condenser, an evaporator and an absorber connected to form a system in which a cooling agent and an auxiliary agent circulate through the evaporator and the auxiliary agent circulates through the absorber, said absorber containing a plurality of superimposed metal members having holes in the same, the holes of proximate members being arranged vertically out of alignment, raised flanges surrounding said holes, and said absorber containing additional superimposed metal members in the upper portion thereof forming a chamber separate from the absorption space of the absorber, a communication between said chamber and the absorbing space of the absorber, means to conduct liquid from said generator to said chamber and a cooling jacket surrounding said absorber.

49. A refrigerating system comprising a generator, an evaporator containing a plurality of substances adapted to have complementary diffusion and to produce refrigeration, an absorber for separating the diffused fluids, condensing means, connecting conduits between the elements of the system to form a plurality of circuits of circulation including an absorber-evaporator cycle, means to continuously build up a pressure gradient within said cycle under the influence of factors within the system to produce circulation of fluid between the absorber and evaporator by continuous dissipation of the pressure gradient and means within said cycle for distributing liquid over a large surface for effective contact with vapor.

50. A refrigerating system comprising a generator, an evaporator containing a plurality of substances adapted to have complementary diffusion and to produce refrigeration, an absorber for separating the diffused fluids, condensing means, connecting conduits between the elements of the system to form a plurality of circuits of circulation including an absorber-evaporator cycle, means for generating a force within said system operating to circulate said plurality of substances between the evaporator and absorber and a plurality of superimposed spaced metal members in said cycle having apertures in the same and arranged to permit formation of pools of liquid upon the same.

51. Refrigerating apparatus comprising a generator, a condenser, an evaporator and an absorber connected to form a system in which a plurality of fluids circulate through the evaporator, said evaporator containing a plurality of spaced metal plates having apertures in the same, some of the apertures forming a tortuous passage for gas and other apertures forming a tortuous passage for liquid.

52. Refrigerating apparatus comprising a generator, a condenser, an evaporator and an absorber connected to form a system in which a plurality of fluids circulate through the evaporator, said evaporator containing a plurality of superimposed spaced metal disks having apertures in the same, and raised rims surrounding said apertures, apertures of one disk being arranged vertically out of alignment with respect to apertures of a proximate disk.

53. Refrigerating apparatus comprising a generator containing ammonia in solution in water and including means to expel the ammonia from said solution, a condenser receiving ammonia vapor from the generator and condensing the same, an evaporator supplied with liquid ammonia from the condenser and containing hydrogen, a plurality of superimposed spaced members in said evaporator arranged to permit formation of pools of liquid ammonia upon the same, an absorber, a plurality of superimposed spaced members in said absorber arranged to permit formation of pools of aqua-ammonia upon the same, means to circulate aqua-ammonia between the generator and absorber and circulation means between the evaporator and absorber operating under influence of force generated within the apparatus to permit the ammonia and hydrogen to circulate from the evaporator to the absorber where the ammonia is absorbed by liquid entering the absorber from the generator and the hydrogen to flow from the absorber to the evaporator.

54. A process of refrigerating through the agency of an absorption system which comprises evaporating a liquid cooling agent in the presence of an auxiliary agent, segregating the cooling agent from the auxiliary agent by absorption in liquid, generating a force within the system, returning the auxiliary agent due to said force to the presence of the cooling agent, and transferring heat from the auxiliary agent passing into the presence of the cooling agent into the mixture of cooling agent and auxiliary agent passing into the presence of the absorption liquid.

55. A continuous process of refrigerating which comprises expelling a cooling agent from a solution thereof in a main body of absorption liquid, condensing the cooling agent, evaporating the condensed cooling agent in the presence of an auxiliary agent, producing a head due to difference in specific weights of a mixture of the vapor of the cooling agent and the auxiliary agent on the one hand and the auxiliary agent on the other hand, continuously separating weakened absorption liquid from the main body, forcing the mixture of cooling agent and auxiliary agent into the presence of the separated absorption liquid under the influence of the head produced and thus causing absorption of the cooling agent and liberation of the auxiliary agent, returning the auxiliary agent into the presence of the cooling agent under the influence of the heat produced, transferring heat from the returning auxiliary agent into the mixture passing into the presence of the separated absorption liquid, and returning the separated absorption liquid to the main body of absorption liquid.

56. That improvement in the art of refrigerating through the agency of an absorption system including an evaporator and an absorber connected to afford a cycle of circulation between them which consists in diffusing a plurality of fluids in the presence of each other in the evaporator, continuously building up a pressure gradient within the cycle under the influence of factors within the system and continuously circulating fluid from the evaporator to the absorber and from the absorber to the evaporator by dissipation of the pressure gradient and transferring heat from fluid passing from the absorber to the evaporator into fluid passing from the evaporator into the absorber.

57. That improvement in the art of refrigerating through the agency of an absorption system including a generator, an evaporator and an absorber connected to afford a first cycle through the absorber and evaporator and a second cycle through the generator and absorber which consists in generating a force within said first cycle, circulating fluid through said first cycle due to said force, transferring heat from the fluid passing from the absorber to the evaporator into fluid passing from the evaporator into the absorber, causing circulation in said second circuit by application of heat and transferring heat from fluid passing from the generator to the absorber into fluid passing from the absorber to the generator.

58. Refrigerating apparatus comprising a generator, a condenser, an evaporator, an absorber, said refrigerating apparatus containing an inert gas for effecting a uniform pressure, a conduit for absorption liquid connecting the lower part of the generator with the upper part of the absorber, a conduit for absorption liquid connecting the lower part of the absorber with the upper part of the generator, the last mentioned conduit having an upwardly extending portion, means to heat said upwardly extending portion and said conduits being for a portion of their length arranged one within the other for exchange of heat between the liquids therein.

59. Refrigerating apparatus comprising a generator, a condenser, an evaporator, an absorber, a heat exchanger, conduits connecting said generator with said heat exchanger and said absorber with said heat exchanger to form a circuit of circulation for absorption liquid between said generator and said absorber, means to heat said generator and auxiliary vaporizing means independent of said generator for causing circulation within said circuit.

60. Refrigerating apparatus comprising a generator, a condenser, an evaporator, an absorber, a conduit connecting said generator with said absorber, a second conduit connecting said absorber with said generator arranged in heat exchange relation with the first conduit, said conduits forming a circuit of circulation for absorption liquid between the generator and absorber, an auxiliary generator interposed in said circuit and means to heat the first mentioned generator and said auxiliary generator.

61. A refrigerating system comprising a generator, a condenser, an evaporator containing a plurality of substances adapted to have complementary diffusion and to produce refrigeration, an absorber for separating the fluids of diffusion, condensing means, connecting conduits between the elements of the system to form a plurality of circuits of circulation including a local cycle between the absorber and evaporator, means for continuously building up a pressure gradient within said cycle under the influence of factors within the system to produce circulation of fluid between the absorber and evaporator by continuous dissipation of the pressure gradient, a major cycle including the generator, the condenser, the absorber and the evaporator wherein a second pressure gradient is continuously formed and dissipated to produce a major circulation, and a local cycle of circulation between the generator and the absorber and an auxiliary generator interposed in the last mentioned local cycle for causing a thermosiphon effect within the same for circulating absorption liquid between the absorber and the generator, said local cycle between the absorber and evaporator containing a heat exchanger for transferring heat from fluid passing from the absorber to the evaporator into fluid passing from the evaporator into the absorber and said local cycle of circulation between the generator and the absorber containing a heat exchanger for transferring heat from fluid passing from the generator to the absorber into fluid passing from the absorber into the generator.

62. That improvement in the art of refrigerating through the agency of a system including an evaporator and containing refrigerant fluid and an additional fluid for equalizing pressure which consists in generating a force within the system, circulating said additional fluid through the evaporator due to said force and transferring heat from said additional fluid as it enters the evaporator into said additional fluid as it leaves the evaporator.

63. That improvement in the art of refrigerating through the agency of an absorption system including an evaporator and an absorber connected to afford a cycle of circulation between them and containing a plurality of cooperating agencies in the evaporator, which consists in generating a force within the system, producing circulation between the absorber and evaporator due to said force and transferring heat from fluid passing from the absorber into the evaporator into fluid passing from the evaporator into the absorber.

64. That improvement in the art of refrigerating through the agency of an absorption system including an evaporator and an absorber connected to afford a cycle of circulation between them and containing refrigerant fluid and additional fluid for equalizing the pressure which consists in generating a force within the system, producing circulation between the absorber and evaporator due to said force and transferring heat from fluid passing from the absorber into the evaporator into fluid passing from the evaporator into the absorber.

65. Refrigerating apparatus comprising a generator, a condenser, an evaporator space, an absorbing space, a heat exchanger having separated passages and means to move gases vertically through said spaces in opposite directions and through said passages in opposite directions.

66. Refrigerating apparatus comprising a generator, a condenser, an evaporator, an absorber, a heat exchanger, means to conduct gas from the lower part of the evaporator to the heat exchanger and from the heat exchanger to the absorber, and means to conduct gas from the absorber to the heat exchanger and from the heat exchanger to the upper part of the evaporator.

67. Refrigerating apparatus comprising, in combination, an absorber, an evaporator, a conduit connecting the lower part of the absorber with the lower part of the evaporator, a U-shaped conduit connecting the upper part of the absorber with the upper part of the evaporator, said conduits being in heat exchange relation.

68. That improvement in the art of refrigerating by the aid of an absorption system containing a cooling agent having a given chemical component, an absorption liquid having the same component and an auxiliary agent for equalizing pressure consisting of said component which consists in generating a force within the system and circulating said auxiliary agent in said system due to said force.

69. That improvement in the art of refrigerating by the aid of a system containing ammonia, water and hydrogen which consists in generating a force within the system and circulating said hydrogen in said system due to said force.

70. That improvement in refrigerating through the agency of an absorption system including a generator, a condenser, an evaporator, and an absorber, which consists in generating a force within the system and circulating hydrogen and ammonia through the evaporator due to said force in a proportion of greater than 0.4 unit per weight of hydrogen to each unit per weight of ammonia.

71. That improvement in refrigerating through the agency of an absorption system including a generator, a condenser, an evaporator, and an absorber, employing ammonia, water and an auxiliary medium in the presence of which the ammonia evaporates, which consists in generating a force within the system, transporting said auxiliary medium and said ammonia into the absorber due to said force and introducing more than 3 units per weight of water weak in ammonia into the absorber for each unit per weight of ammonia entering the absorber.

72. That improvement in refrigerating through the agency of an absorption system including a generator, a condenser, an evaporator and an absorber, employing ammonia, water and hydrogen, which consists in generating a force within the system, circulating ammonia and hydrogen through the evaporator due to said force in a proportion of greater than 0.4 unit per weight of hydrogen to 1 unit per weight of ammonia, and circulating aqua-ammonia between the generator and the absorber in a proportion greater than 3 units per weight of weak aqua-ammonia for 1 unit per weight of ammonia entering the absorber.

73. That improvement in the art of refrigerating by the aid of a system containing refrigerant fluid and hydrogen for equalizing pressure which consists in generating a force within the system and circulating said hydrogen in said system due to said force.

74. That improvement in the art of refrigerating by the aid of a system containing refrigerant fluid and an inert gas which consists in generating force within the system and circulating said inert gas within the system due to said force.

75. That improvement in the art of refrigerating by the aid of an absorption system including an evaporator and an absorber connected to afford a cycle of circulation between them and containing refrigerant fluid and additional fluid in the presence of which the refrigerant fluid evaporates which consists in generating force within the system and, in normal operation, circulating said additional fluid due to said force through said cycle and through the evaporator and absorber continuously in one direction.

76. That improvement in the art of refrigerating through the agency of an absorption system including a generator, an absorber and an evaporator connected to afford a first cycle through the evaporator and absorber and a second cycle through the evaporator and generator and containing refrigerant fluid and additional fluid in the presence of which the refrigerent fluid evaporates which consists in generating force within the system and circulating said additional fluid through said first cycle due to said force and circulating refrigerant fluid through said second cycle in parallel to flow of the additional fluid through the first cycle.

In testimony whereof we hereunto affix our signatures.

BALTZAR CARL von PLATEN.
CARL GEORG MUNTERS.